United States Patent [19]

Nakamori et al.

[11] 4,320,909
[45] Mar. 23, 1982

[54] OCCUPANT'S KNEE PROTECTING DEVICE

[75] Inventors: Takashi Nakamori, Yokosuka; Zensho Matsumoto, Yokohama; Kiyomi Matsushita, Yokosuka; Masayoshi Katoh, Yokohama; Hideoki Matsuoka, Yokohama, all of Japan

[73] Assignee: Nissan Motor Co., Ltd., Yokohama, Japan

[21] Appl. No.: 136,605

[22] Filed: Apr. 2, 1980

[30] Foreign Application Priority Data

Apr. 10, 1979 [JP] Japan ............................. 54-47351[U]

[51] Int. Cl.³ ............................................... B60R 21/02
[52] U.S. Cl. ................................................... 280/752
[58] Field of Search .............. 280/751, 752, 750, 748, 280/730; 180/90; 188/1 C

[56] References Cited

U.S. PATENT DOCUMENTS

| 3,439,769 | 4/1969 | Brilmyer | 280/752 |
| 3,897,848 | 8/1975 | Arnston et al. | 280/752 |
| 3,930,665 | 1/1976 | Ikawa | 280/752 |
| 4,065,157 | 12/1977 | Abe et al. | 280/751 |
| 4,194,762 | 3/1980 | Sudo | 280/751 |

Primary Examiner—David M. Mitchell
Attorney, Agent, or Firm—Thompson, Birch, Gauthier & Samuels

[57] ABSTRACT

A section of a shock absorbing member, which is located in the vicinity of a hard projection, has higher stiffness than another section of the same which is located in the distance from the hard projection, so that when the occupant's knee portion is forced to move toward the hard projection and collides with the shock absorbing member upon vehicle collision, the knee portion under movement is forced to turn in a lateral direction, that is toward the low stiffness or safety section of the member, losing its kinetic energy.

5 Claims, 11 Drawing Figures

OCCUPANT'S KNEE PROTECTING DEVICE

FIELD OF THE INVENTION

The present invention relates in general to a vehicle safety device and more particularly to a device for protecting the occupant's knees from injury during a collision of the vehicle.

BACKGROUND OF THE INVENTION

To protect knees or knee portions of a front seat occupant from injury caused by striking hard projecting parts, such as a steering column or the blower unit of air conditioner, upon a vehicle collision, it has been proposed to have the vehicle equipped with an occupant knee protecting device which is mounted in front of the front seat. Some of these conventional devices are of a type composed of a deformable shock absorbing member which absorbs kinetic energy when struck by a vehicle occupant's knee during a collision. However, as will be apparent hereinafter, some knee protecting devices of the above-mentioned type sometimes cause severe problem due to their inherent constructions.

SUMMARY OF THE INVENTION

According to the present invention, an occupant knee protecting device includes a shock absorbing member arranged such that when the occupant's knee portion collides with the shock absorbing member upon vehicle collision, the member is deformed to a certain degree to absorb kinetic energy of the knee portion, the member having a first section located in the vicinity of the hard projection and a second section spaced a distance from the hard projection; and means for causing the first section to have higher stiffness than the second section.

OBJECTS OF THE INVENTION

It is an object of the present invention to provide an improved knee protecting device which is free of the drawbacks encountered in prior art knee protecting devices.

It is another object of the present invention to provide an improved knee protecting device which is constructed to reliably protect the occupant's knee portion from striking against projected hard parts, such as a steering column or blower unit of air conditioner, while sufficiently absorbing kinetic energy of the knee portion, upon vehicle collision.

It is still another object of the present invention to provide a protecting device which is compact in size and simple in construction.

Other objects and advantages of the present invention will become apparent from the following description when taken in conjunction with the accompanying drawings.

DESCRIPTION OF CONVENTIONAL KNEE PROTECTING DEVICES

Figure 1:
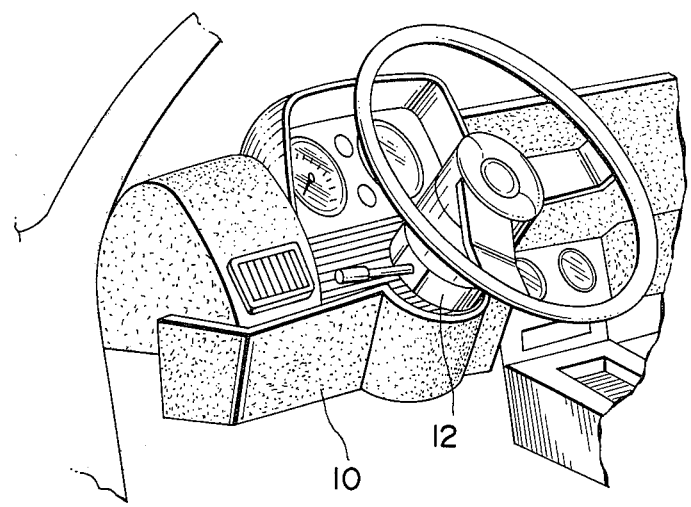
FIG. 1 is a perspective view of a portion of a vehicle interior in front of driver's seat, showing a driver's knee protecting device incorporated with a steering column.

Prior to describing in detail the knee protecting device of the present invention, a brief explanation of the conventional knee protecting devices will be made with reference to FIGS. 1 to 4 of the drawings. For ease of description, the following explanation will be made with respect to an exemplified case in which the knee protecting device is designed to protect the driver's knee portion from striking against a steering column, as is shown in FIG. 1. In this drawing, the driver's knee protecting device and the steering column are designated by numerals 10 and 12, respectively.

Figure 2A:
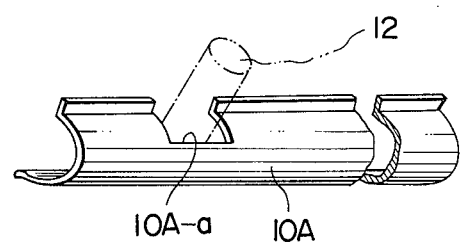
FIGS. 2A, 2B and 2C are perspective views of conventionally used knee protecting devices.
Figure 2B:
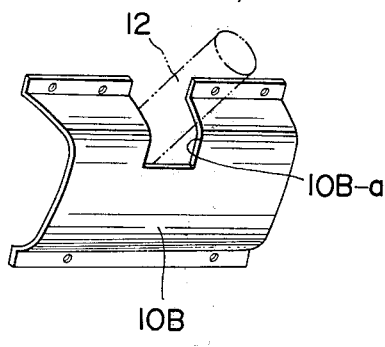
Figure 2C:
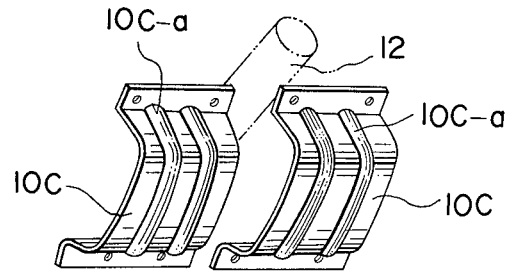
Figure 3:
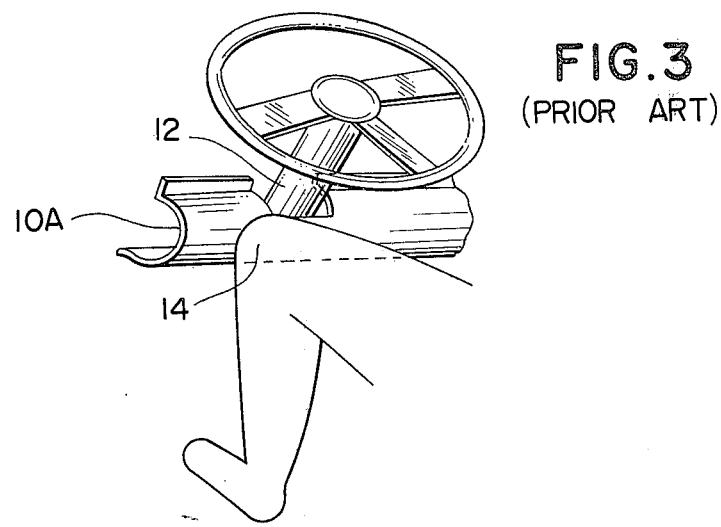
FIG. 3 is a perspective view illustrating one of the drawbacks encountered with the conventionally used knee protecting devices.

Referring to FIGS. 2A, 2B and 2C, there are respectively shown three kinds of conventional knee protecting devices 10A, 10B and 10C each being mounted adjacent to a steering column 12. For ease of illustration, pads to be affixed to the devices proper (or shock absorbing members) are omitted from the drawings. Each knee protecting device 10A, 10B or 10C extends laterally in front of the driver's seat and is mounted to a dash board or the like in a manner as is illustrated in FIG. 1. The device 10A shown in FIG. 2A comprises a channel member of steel having a semicircular cross section, and the device 10B of FIG. 2B comprises a bent plate of steel. These devices 10A and 10B are mounted to the vehicle so that notches 10A-a and 10B-a formed therein receive the steering column 12. The knee protecting device 10C shown in FIG. 2C comprises two separate parallel bent plates each being reinforced by evenly spaced ridge portions 10C-a. The two bent plates 10C are spaced so as to accomodate the steering column 12 therebetween. In these knee protecting devices 10A, 10B and 10C, however, a severe problem tends to arise. This problem is illustrated in FIG. 3, wherein the knee protecting device 10A of FIG. 2A is being used. When vehicle collision occurs with the driver's knee portion 14 facing the steering column 12, it sometimes happens that the knee portion 14 reaches and strikes against the steering column 12 after deforming the device 10A. This of course causes injury of the knee portion 14 of the driver. Experiment has revealed that such undesired phenomenon originates from even stiffness or even strength possessed by the device 10A throughout the entire construction of the same.

Figure 4:
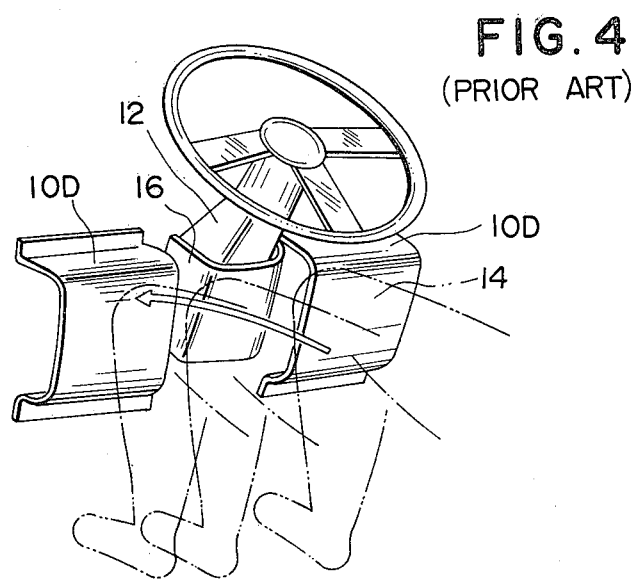
FIG. 4 is a view of another conventional knee protecting device by which partially solves the drawback illustrated in FIG. 3.

One attempt at solving the above-mentioned problem is depicted by FIG. 4. Here, two bent plates 10D of steel are spaced to accommodate the steering column 12 therebetween, and a generally U-shaped defence plate 16 is disposed in spaced relationship about the steering column 12. Upon vehicle collision, the driver's knee portion 14 is deflected in a lateral direction, along a smoothly curved outer surface of the defence plate 16, toward one of the bent plates 10D, even if the knee portion was facing the steering column 12 before the collision. However, this measure requires an increased number of parts and troublesome production procedures which in turn contribute to an increase of the vehicle's cost. Further, mounting such device to the vehicle will narrow the foot space of the driver. It is thus an essential object of the present invention to provide an improved knee protecting device which is free of the drawbacks mentioned hereinabove.

DESCRIPTION OF EMBODIMENTS OF THE INVENTION

Referring to FIGS. 5A, 5B, 5C and 5D of the drawings, there are illustrated first, second, third and fourth embodiments of the present invention.

Figure 5A:
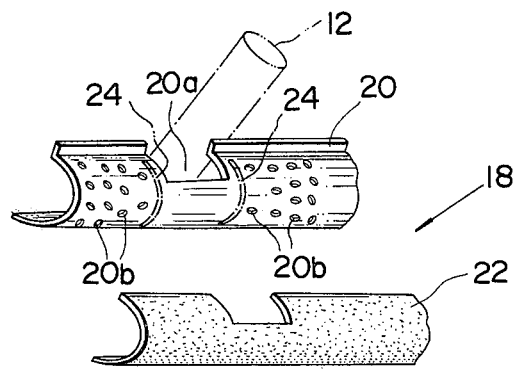
FIGS. 5A, 5B, 5C and 5D are perspective views of improved knee protecting devices according to the present invention.

The knee protecting device of the first embodiment of FIG. 5A comprises a flanged channel member 20, made of for example of steel, which has a generally C-shaped cross section. Although not shown in the drawing, the channel member 20 extends laterally in front of the driver's seat and is mounted to a dash board or the like in a manner as is illustrated in FIG. 1. The channel member 20 is mounted such that a notch 20a formed in an upper section of the member 20 receives the steering column 12. Designated by numeral 22 is a pad which is to be affixed to the outer surface of the channel member 20.

A plurality of identical holes or openings 20b are formed in the channel member 20. However, it should be noted that the distribution of these holes 20b is such that no holes are present at a section adjacent the notch 20a, but relatively large numbers of holes 20b are present at sections spaced laterally to either side of the notch 20a. With this measure, the stiffness of the sections on either side of the notch 20a is less than that of the section directly adjacent to the notch 20a. Instead of the identical holes 20b, holes which are different in size may also be employed, so long as their distribution brings about the same effect as that mentioned above. Preferably, the distribution of the holes 20b is such that the stiffness of the channel member 20 is gradually decreased as the distance from the notch 20a increases. Further, if desired, ribs 24 may be fixed to the inner side of the channel member 20 on either side of the notch 20a for increasing the stiffness of the section located therebetween.

Figure 6:
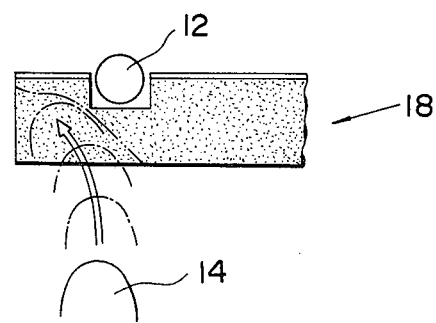
FIG. 6 is a view illustrating the improvement achieved by each of the knee protecting devices of the present invention.

Referring now to FIG. 6, it will be seen that with the above-identified arrangement, when vehicle collision occurs under a condition wherein the knee portion 14 of the driver is facing the steering column 12, the knee portion 14 moves forward at great speed and engages the knee protecting device 18, and the center section of the channel member 20 is bent while absorbing kinetic energy. Because of the decreased stiffness of the channel member at the lateral sections interrupted by holes 20b, the knee portion is deflected away from the steering column 12 in a lateral direction as indicated by the arrow in FIG. 6. This avoids any impact of the knee portion against the steering column, thereby protecting the driver from injury.

Figure 5B:
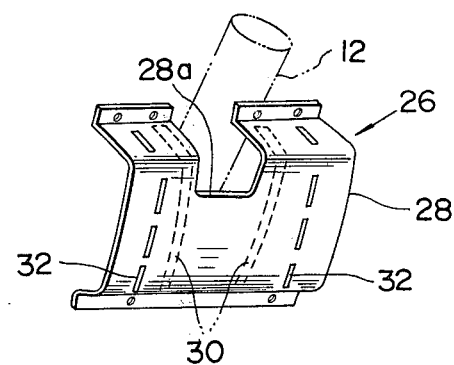

A second embodiment of the knee protecting device is shown at 26 in FIG. 5B. The device 26 comprises a flanged bent plate 28 made for example of steel, and a pad (not shown) covering the outer surface of the plate 28. As shown, the plate 28 is formed at its top section with a notch 28a for receiving therein the steering column 12. Two rib members 30 are attached to the back surface of the plate 28 on either side of the notch 28a for increasing stiffness of the section adjacent to the notch 28a. A plurality of elongate openings 32 are formed in the plate 28 at sections on either side of and spaced laterally from the notch 28a thereby to lower the stiffness of those sections. With this construction, the knee protecting device 26 performs in substantially the same manner as the above-described device 18 upon vehicle collision.

Figure 5C:
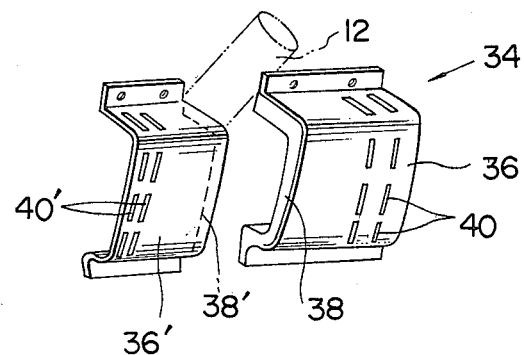

A third embodiment of the knee protecting device is shown at 34 in FIG. 5C, comprising two flange bent plates 36 and 36' made for example of steel, and pads (not shown) affixed to the outer surfaces of the plates 36 and 36'. Each of the plates is provided with a reinforcing flange 38 or 38' at one side thereof and is formed with a plurality of elongate openings or slits 40 or 40' at a section spaced laterally from the flanged side, as shown. When assembled, the flanged sides of the bent plates 36 and 36' are spaced one from the other to accommodate the steering column 12 therebetween.

Figure 5D:
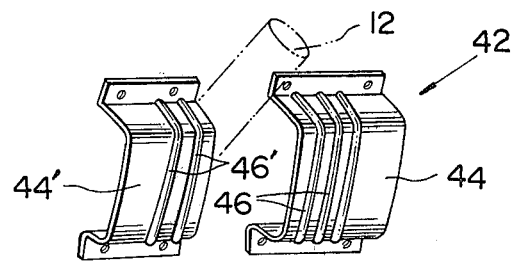

A fourth embodiment of the knee protecting device shown in FIG. 5D at 42 comprises two flanged bent plates 44 and 44' made for example of steel, and pads (not shown) affixed to the plates 44 and 44'. As shown, corrugations or ridges 46 or 46' are formed on the plates 44 and 44' at sections thereof adjacent the steering column 12 to increase the stiffness of those sections.

From the above, it will be appreciated that the knee protecting devices 18, 26, 34 and 42 have a common feature in which the stiffness of a section of the device laterally remote from the steering column 12 is lower than a section of the same adjacent the steering column 12. Thus, even when the driver's knee portion 14 is facing the steering column 12 upon vehicle collision, the knee portion 14 is forcedly turned away from the steering column, while its kinetic energy is being dissipated.

Although, in the above, description is made particularly with respect to a driver's knee protecting device in association with a steering column, such devices also may be associated with other rigid inwardly projected parts, such as the blower unit of an air conditioner, for protecting the occupant's knee portion from striking against such parts upon vehicle collision.

What is claimed is:

1. For use in a vehicle having a passenger compartment with an inwardly protruding rigid element, a device for protecting the knee of a vehicle occupant from injury resulting from impact with said element, said device comprising:
   two separate shock absorbing members adapted to be mounted in the compartment in spaced apart relationship to define an opening therebetween aligned with said rigid element; and
   means integral with each of said shock absorbing members for varying the stiffness thereof in a manner such that the stiffness of a first section of each shock absorbing member adjacent to said opening is greater than that of a second section of each shock absorbing member laterally remote from said opening.

2. The device of claim 1 wherein each of said shock absorbing members consists of a steel plate having a generally C-shaped cross-section, with the convex side of each plate protruding into the passenger compartment.

3. The device of claim 2 wherein said means comprises a reinforcing flange at the first section of each shock absorbing member and a plurality of holes in the second section of each shock absorbing member.

4. The device of claim 3 wherein the number of said holes per unit of plate area increases in direct proportion to an increase in the lateral distance of said holes from said opening.

5. In a vehicle having a rigid steering column protruding into the passenger compartment, a device for protecting the driver's knee from injury resulting from impact with said steering column upon a vehicle collision, said device comprising: two separate shock absorbing steel plates mounted in said compartment in spaced apart relationship to define an opening therebetween aligned with said steering column, said plates having generally C-shaped cross sections arranged with their convex sides protruding into the passenger compartment, each of said plates having a first section adjacent to said opening and a second section laterally remote from said opening, reinforcing flanges at the first sections of each of said plates arranged to increase the stiffness thereof, said flanges extending in a generally vertical planes; and a plurality of elongated openings formed in the second sections of said plates in order to decrease the stiffness thereof so that the stiffness of said second sections is less than that of said first sections, the number of said holes per unit of plate area being increased in direct proportion to an increase in the lateral distance from said flanges.

* * * * *